United States Patent [19]

Fujiwara

[11] Patent Number: 4,798,236

[45] Date of Patent: * Jan. 17, 1989

[54] HIGH PERFORMANCE TIRE TREAD

[75] Inventor: Kenichi Fujiwara, Miki, Japan

[73] Assignee: Sumitomo Rubber Industries, Ltd., Japan

[*] Notice: The portion of the term of this patent subsequent to Nov. 15, 2005 has been disclaimed.

[21] Appl. No.: 848,280

[22] Filed: Apr. 4, 1986

[30] Foreign Application Priority Data

Apr. 12, 1985 [JP] Japan .............................. 60-78885

[51] Int. Cl.⁴ ........................................... B60C 11/03
[52] U.S. Cl. .................................. 152/209 R; 152/535
[58] Field of Search ........... 152/209 R, 209 D, 209 B, 152/543, 535; D12/136, 140

[56] References Cited

U.S. PATENT DOCUMENTS

| | | | |
|---|---|---|---|
| 4,086,948 | 5/1978 | Suzuki et al. ...................... | 152/543 |
| 4,424,844 | 1/1984 | Fontaine ........................... | 152/209 R |
| 4,424,845 | 1/1984 | Baus et al. ........................ | 152/209 R |
| 4,461,334 | 7/1984 | Tansei ............................... | 152/209 R |
| 4,545,415 | 10/1985 | Lindner et al. ................... | 152/209 R |
| 4,546,808 | 10/1985 | Fontaine et al. ................. | 152/209 R |
| 4,619,300 | 10/1986 | Tokunaga et al. ............... | 152/209 R |

FOREIGN PATENT DOCUMENTS 0061008  4/1983  Japan .............................. 152/209 R Primary Examiner—Michael Ball
Assistant Examiner—Geoffrey L. Knable
Attorney, Agent, or Firm—Stevens, Davis, Miller & Mosher

[57] ABSTRACT

A high performance tire, in which a plurality of narrow cuts are disposed on both shoulder parts where heat generation is most notable, to control the heat generation by decreasing the pattern stiffness. The slippage of tread rubber is prevented due to improved grounding performance of both shoulder parts, so the high-speed durability and the stepped shoulder wear are improved in spite of the extra heavy tread with deepest longitudinal main grooves. At the same time, wear life of the tread, wandering performance including wet grip performance, ride feeling and handling stability can effectively improved in a well-balanced manner.

4 Claims, 8 Drawing Sheets

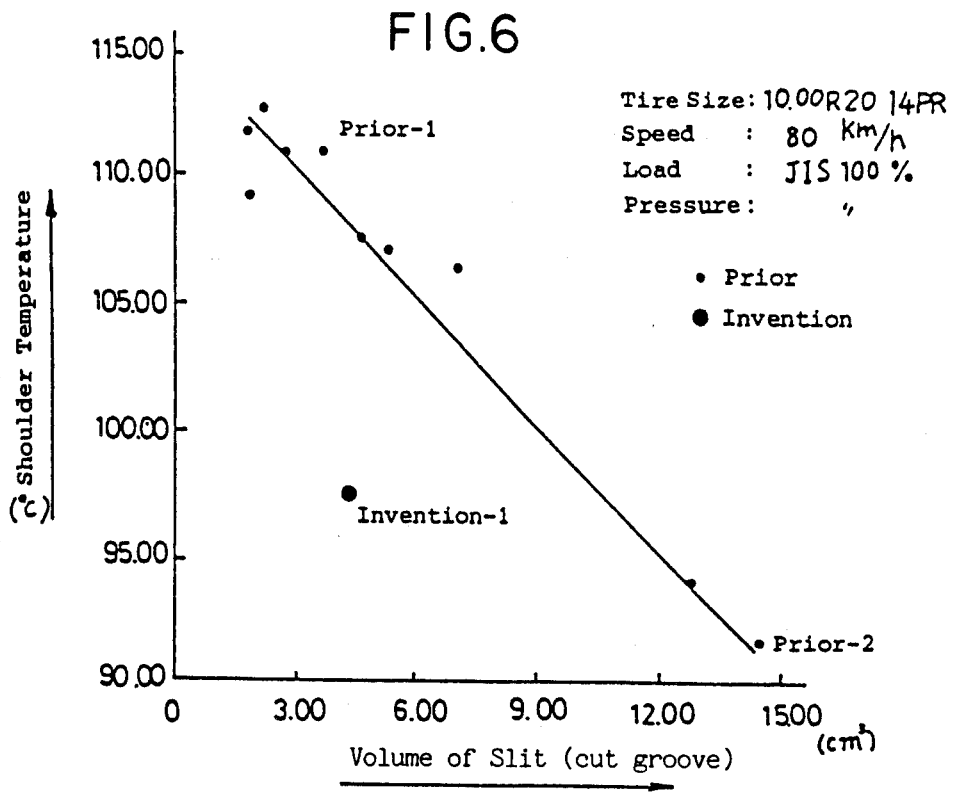
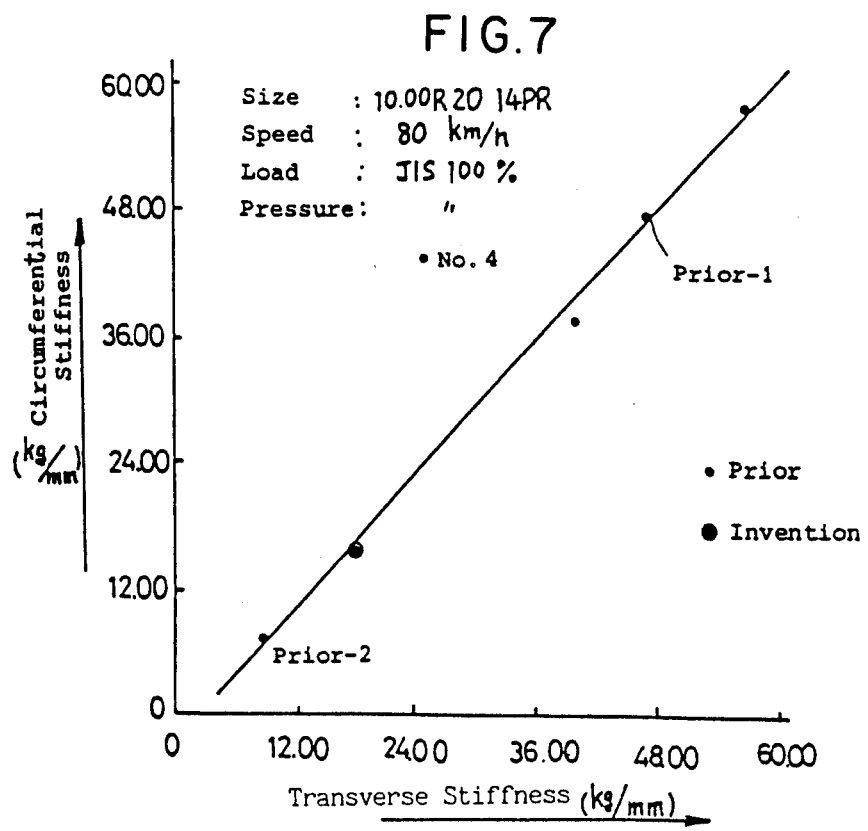

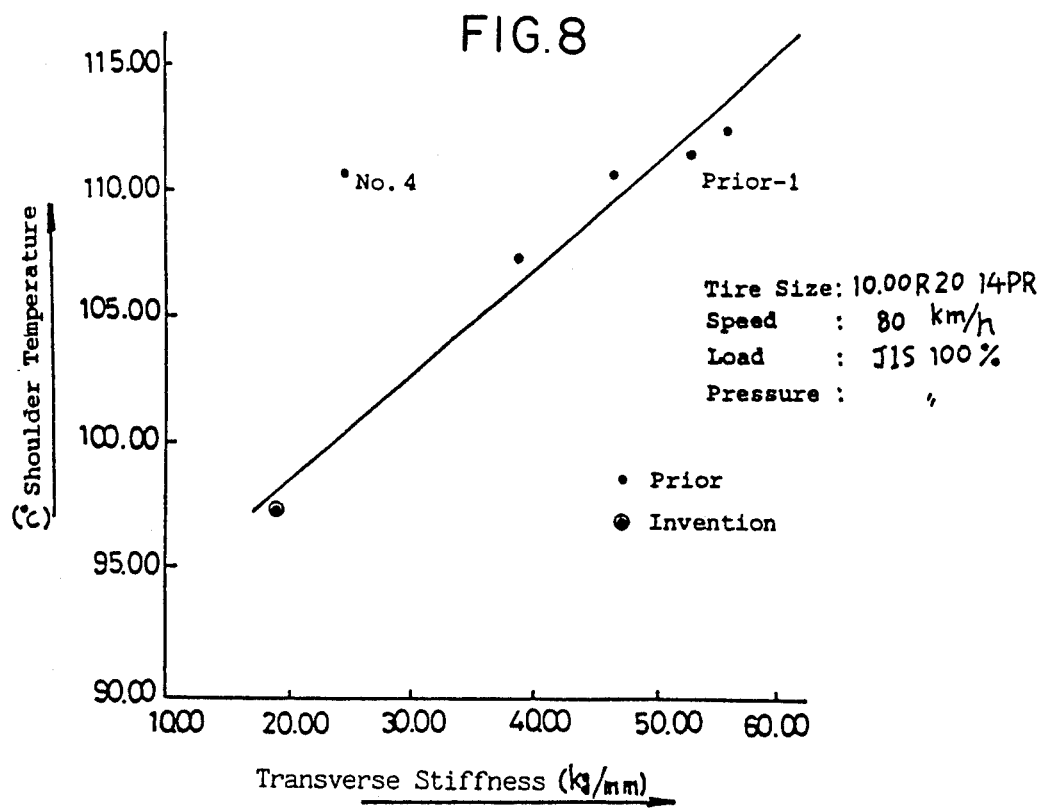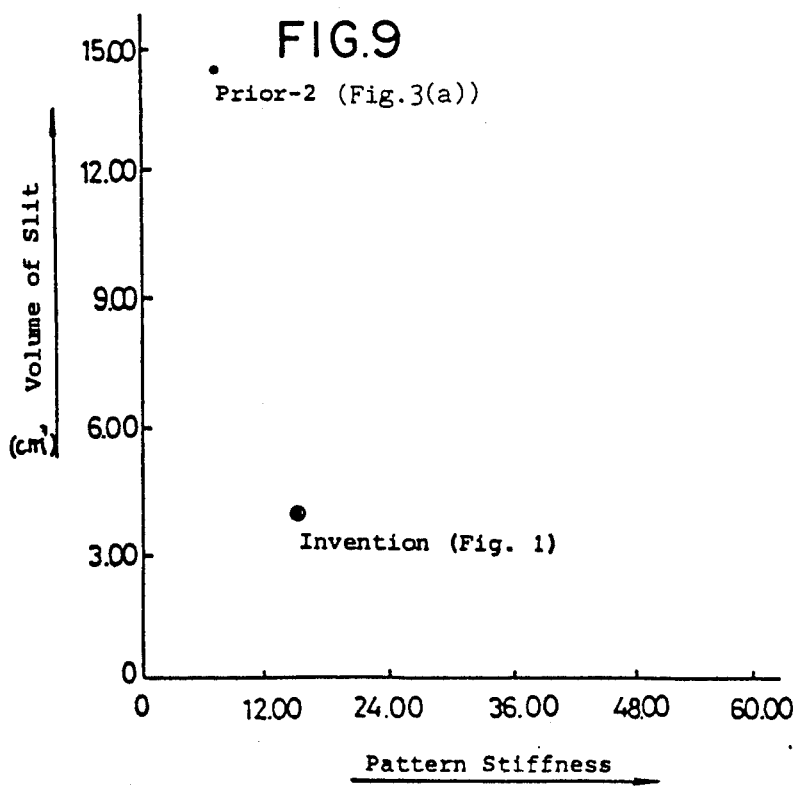

HIGH PERFORMANCE TIRE TREAD

BACKGROUND OF THE INVENTION

1. Field of the Invention

The present invention relates to heavy duty pneumatic radial ply tires suitable for use in heavy vehicles such as a truck, a bus and the like, and more particularly to an improvement of a pneumatic tire provided with a tread pattern divided by two main longitudinal grooves having deepest depth extending to the circumferential direction of said tread into a tread center portion and both shoulder portions in which a rib or block pattern is provided thereon.

2. Prior Art and Problems Thereof

In general, it has been well known that radial tires have several merits such as wear resistance of tread rubber, lack of heat generation during high speed traveling, puncture resistance and the like as compared with conventional bias tires. In consequence of the remarkable improvement of highways networks, the demand for heavy duty radial tires has been rapidly increased. On the other hand, the performance of vehicles has been improved, so that traveling distance of vehicles or cars have been considerably spread in conjunction with the development of the highways. Furthermore, when the length of highways grow longer, not only the chance of continuous traveling for a long period of time at high speed has been increased, but also the requirement for a tire having long wear life has been rapidly conspicuous for economic reasons.

However, there has been fatal problems in that the means according to the prior art to solve these problems are all antipathetic to each other in that a tire designed to weigh heavily in durability to high speed running is inevitably followed by short life because of wear and, on the contrary, a tire weighted in resistance to wear and long life is insufficient in durability to high speed running.

For instance, the means of the prior art for achieving improvement in durability to high speed running have been such means as the employment of a tread small in gauge for the need to decrease heat generation. To explain it cincretely, a tire in the size of 10,00 R 20 having a maximum speed capability of 80 km/h is 20.6 mm in maximum groove depth, on the contrary, a tire having a maximum speed capability of 100 km/h is 13.5 mm in maximum groove depth which is the category of "highway depth", thus, to compared with them, the difference in tread gauge is 7 mm at the difference of 20 km/h in maximum speed, the wear life of tread is reduced in keeping with the difference in tread gauge, accordingly the wear life of such tires having thin tread gauge is shortened as an inevitable consequence.

However, the user of tires cannot be satisfied with such unbalanced tire performance for any length of time, the requirement for well balanced tire, which has a long life and an improved high speed durability, has become conspicuous of late. That is, it is required to increase the durability of such tire as the depth of longitudinal main grooves is deeper than that of the conventional tire and the thickness of tread gauge is greater than that of a conventional one. Furthermore, as the problem inherent to a tire having a carcass ply of radial construction, there is a problem of wear which causes generation of steps extending transversely in the cross sectional direction of the tire and particularly causes the tread rubber facing both the shoulder portions to wear more readily than the tread rubber facing the center portion which is called uneven shoulder wear.

Many attempts such as means to increase the tread radius or to decrease the tread width have been made to avoid uneven shoulder of the tire, but hitherto none has led to fully satisfactory results which can effectively avoid uneven shoulder wear of the tire, by which the wear life of the tire is caused to be greatly shortened.

BRIEF SUMMARY OF INVENTION

It is an object of the present invention to provide a pneumatic radial tire improved in both the resistance to wear and high speed durability at same time together with the improvement in maneuverability and ride feeling in a pneumatic radial ply tire suitable for use in heavy duty vehicles such as trucks, buses and the like.

BRIEF DESCRIPTION OF THE DRAWINGS

FIG. 6 is a graph showing the relation between volumes of Cut grooves and temperature;

FIG. 7 is a graph showing the relation between circumferential stiffness and transverse stiffness;

FIG. 8 is a graph showing the relation between transverse stiffness and temperature at the shoulder parts;

FIG. 9 is a graph showing the relation between pattern stiffness and volume of groove;

DETAILED DESCRIPTION

Figure 1:
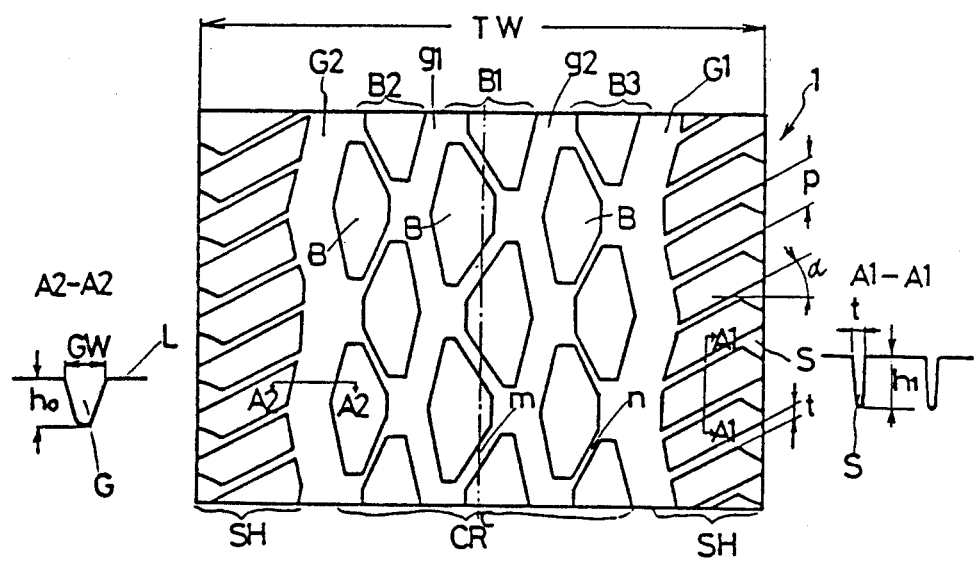
FIG. 1 is a developed plan view of a tread pattern having a series of narrow cut grooves at the shoulder parts according to the present invention.

As stated above, it has not been attainable by the prior art to get so well balanced an improvement as to simultaneously increase the durability of high-speed running, resistance to wear (long life) and overcome uneven shoulder wear. However, the inventors of the present invention made various investigations about tread patterns which can decrease the heat generation of such tires as being superior in resistance to tread wear. As the result, they found the means as described below to solve the said problem.

That is, in a heavy duty pneumatic radial tire, which comprises at least one carcass ply of a radial construction or a semi-radial construction composed of one rubberized ply layer containing metal cords embedded therein and both edges thereof turned up around the bead cores, a bead apex rubber stock extending radially outwardly from its base adjacent to the bead core in a space between the main portion of the carcass ply and the turned up portion of the carcass ply is disposed, with a reinforcing layer composed of rubberized steel cords disposed outside said turned up portion of the carcass ply and, further, a protective layer composed of an organic fiber cord is disposed adjacent to the outside of said turned up portion, said reinforcing layer and said bead apex rubber stock, and a tread reinforced with a belt layer superimposed about said carcass ply for stiff reinforcement beneath a tread and composed of at least three rubberized ply layers each containing metal cords embedded therein, said metal cords of which being in parallel with each other in each ply and being crossed when grouped into plies with each other at a relatively small angle with respect to the circumferential direction of a tire, and further, sidewalls disposed between the edges of said tread and each bead, characterized in that: the said tread surface contacting with ground is partitioned by two main longitudinal grooves extending in the circumferential direction of a tire in the shape of zigzag or wavy line into a tread crown part having a width corresponding to about 30 to 65% of the tread width and centering at the equatorial plane of the tire and into the tread shoulder parts lying on both sides outside said tread crown part; one or more central ribs or rows of central blocks comprising blocks in various shapes are provided on said crown part whereas there are outer ribs or outer rows of blocks on both said shoulder parts; and a plurlity of narrow cut grooves extending in the axial direction of the tire are provided in the ribs or the blocks on said shoulder parts so that the circumferential stiffness index of the pattern and the volume index of the cut groove may be set at 30 to 70 and 2.5 to 15, respectively.

Wherein said cut groove is not greater than 6 mm in width and is equal to or smaller than the longitudinal groove in depth and the center line of said cut grooves inclines at an angle in a range from 0 to 45 with respect to the axial direction of the tire and the circumferential pitch length between said cut grooves is within the range under 1.1% length of the circumference of the tire at the center of the tread under inflation at normal maximum internal pressure. The definition of "circumferential pattern stiffness" and "volume index" of the cut grooves will be explained hereinafter. (Circumferential patern stiffness index)

Figure 11:
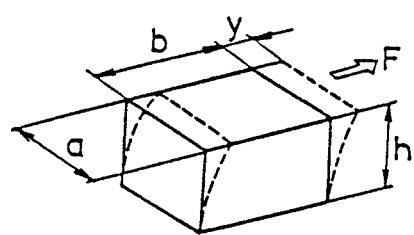
FIG. 11 is a view of block sample for describing the secondary moment of the pattern stiffness index at the section of block.
Figure 12:
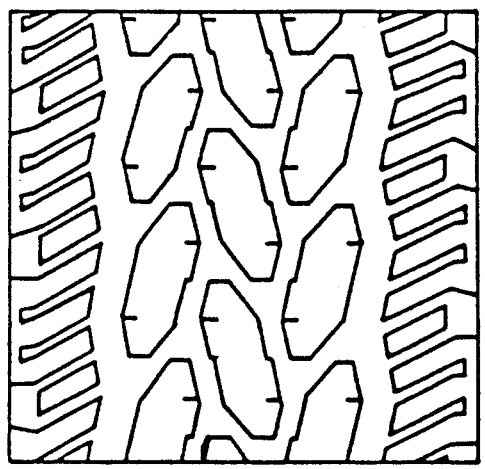
FIG. 12 is a developed plane view of another embodiment of tread pattern according to the present invention.

In said shoulder parts, circumferential pattern stiffness, which is in contact length with ground under specified load and inner pressure, is defined by the below equations:

$$kp = \frac{F}{Y} = 1 / \left( \frac{h^3}{3EI} + \frac{h}{AG} \right)$$ equation (1)

kp: Pattern stiffness (kg/mm)
F: Tangential stiffness (kg/mm)
Y: Displacement of pattern (mm)
h: Pattern depth (mm)
E: Elastic modulus at elongation of tread rubber (kg/mm$^2$)
G: Shearing modulus (=E/3) (kg/mm$^2$)
I: secondary moment at block section (mm$^4$) I=a b$^{3/12}$ in the block shown in FIG. 11
A: Sectional area of block (mm$^2$)

In the case of an actual pattern, the pattern depth is different from the depth h1 of the cut groove in the shoulder parts, and several blocks are adopted, so it is treated as follow:

the pattern stiffness at the tread surface, $$Kps = Kps1 + Kps2 \ldots + Kpsn$$

to use h=h1 in equation (1) the pattern stiffness (KpB) at the base of the tread part is to use h=ho−h1 (FIG. 1) in equation (1) the total pattern stiffness KpT $$K_{PT} = 1 / \left( \frac{1}{K_{ps}} + \frac{1}{K_{pB}} \right)$$

the pattern stiffness Kpo in the case of no subgroove is to use h=ho in equation (1).

$$\frac{\text{circumferential stiffness}}{\text{index of the pattern}} = \frac{K_{PT}}{K_{po}} \times 100$$

(Volume index of the cut groove)
the ratio of the volume of groove to the total volume of shoulder part.

Volume index of the cut groove =

$$\frac{\text{Volume of cut grooves in shoulder part}}{\text{surface area of shoulder part} \times \text{pattern depth}} \times 100$$

Figure 2:
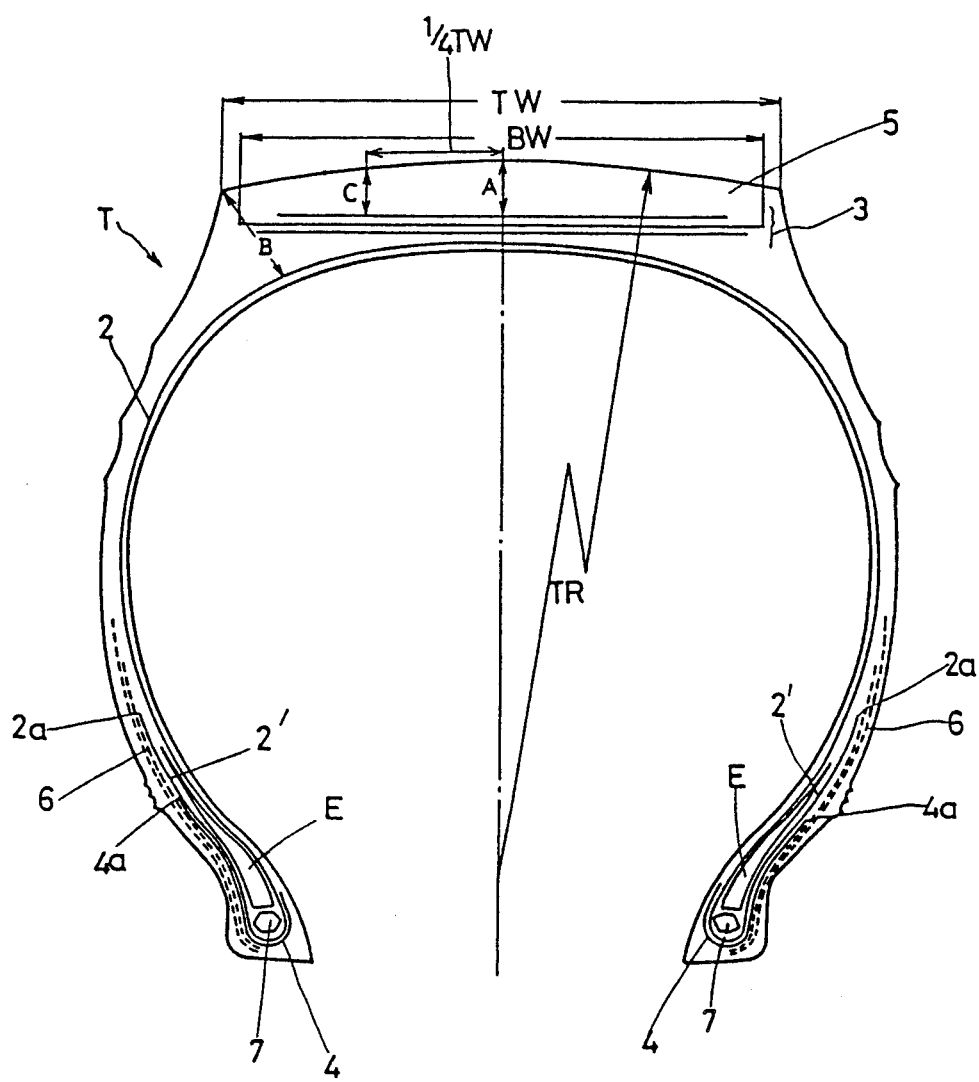
FIG. 2 is a view showing a cross sectional structure of a steel radial tire to be used for trucks and buses.

(Example)
An example according to the present invention will be explained with reference to the drawings. A radial tire T for heavy duty vehicles according to the present invention as shown in FIG. 2, for reinforcing the region of the turned up portion 2' of the carcass ply 2 composed of steel cords which is turned up around a bead core 7 from the inside towards the outside, a steel cord reinforcing layer 4 has been arranged in such a way as to extend from the outside to the inside of the bead region in the axial direction through the bead base, thereby surrounding the bead region. The steel cord reinforcing layer 4 is provided for the exclusive purpose of mitigating the stress concentration on the upper end 2a of the turned up portion 2' of the carcass ply 2 and, accordingly, a structure having the upper end part 4a of the steel cord reinforcing layer 4 placed higher than the upper end 2a of the turned up portion of the carcass ply 2' has been employed. On the other hand, in order to more effectively prevent withdrawal of the carcass ply 2, a structure has also been employed in which the upper end 4a of the steel cord reinforcing layer 4 is kept lower, while relatively raising the upper end 2a of the turned up portion of the carcass ply 2 (FIG. 2), as to prevent the withdrawal of the carcass ply, this arrangement is effective, but a crack is liable to occur at the end, this is because the end of the turned up portion of the carcass ply is higher and a stress concentration is liable to occurs at the upper end 2a of the turned up portion of the carcass ply, in order to alleviate the stress concentration, a fiber cord reinforcing layer 6 can be arranged further outside and adjacent to the steel cord reinforcing layer 4. An apex rubber E composed of a single rubber stock or two kinds of rubber stock is disposed between the main portion 2 of the carcass ply and the turned up portion 2', extends outwardly radially from the bead core 7 and decreases in thickness towards the sidewall of the tire to form a substantially triangular section. And a belt 3 superimposed about said carcass 2 beneath a tread 5 and composed of a plurality of rubberized ply layer each containing steel cords embedded therein.

It is preferable that a width BW of the belt structure 3 reinforcing the tire tread ranges from 80 to 95% of the width TW of the tread 5 so that the tread may be widely and surely supported and reinforced. Further, the formation of a belt layer with cords intersecting with each other in a triangular pattern is advantageous for an increase in stiffness thereof and reinforcement of the tread. That is to say, it is preferable for increasing stiffness of the belt structure that at least three plies, each composed of low-stretchable or non-stretchable cords are stacked so as to be in direct contact with each other, wherein the adjacent two plies are arranged at bias angles equal in degree but directionally opposite to each other. Preferably as small as ranging from 10° to 25°, with respect to the equatorial plane of the tire, and the cords of the third ply provide an angle larger than that provided by cords of the former two plies, for example, within the range from 40° to 70° with respect to the above said equatorial plane.

On the assumption that the belt layer is of highly stiff structure as above, the stiffness of the tread region become high at the same time, owing to the contribution of said high stiffness, resistance of tread rubber to wear is increased. In order to increase the wear life of tread rubber, it is necessary to improve the resistance of tread rubber to wear together with increasing of tread rubber in thickness at (A), (B) and (C). However, the heat generation of the tire tends to increase with increasing of rubber gauge of (A), (B) and (C), as the result. There was no other means of designing a tire for high speed use but to thin the tread rubber gauge so as to control the heat generation, that is at the sacrifice of the wear life of tire.

Generally, it is know that the temperature generated while a tire is in rotation, is highest at both said shoulder parts of the tire except special cases, then, the inventor of this invention, as to temperature rise at both shoulder parts, selected seven items such as the ratio between surface areas of cut grooves at the shoulder parts, shape index cross-sectional area of loaded tire (free surface area), pattern transverse stiffness, pattern circumferential stiffness, volume of cut groove, shoulder gauge, and tread radius as factors of temperature rise and examining a correlation between temperature and the above factors depending on multiple regression analysis, it has been found that "circumferential stiffness" and "volume of cut groove" greatly contribute to temperature rise.

Figure 5:
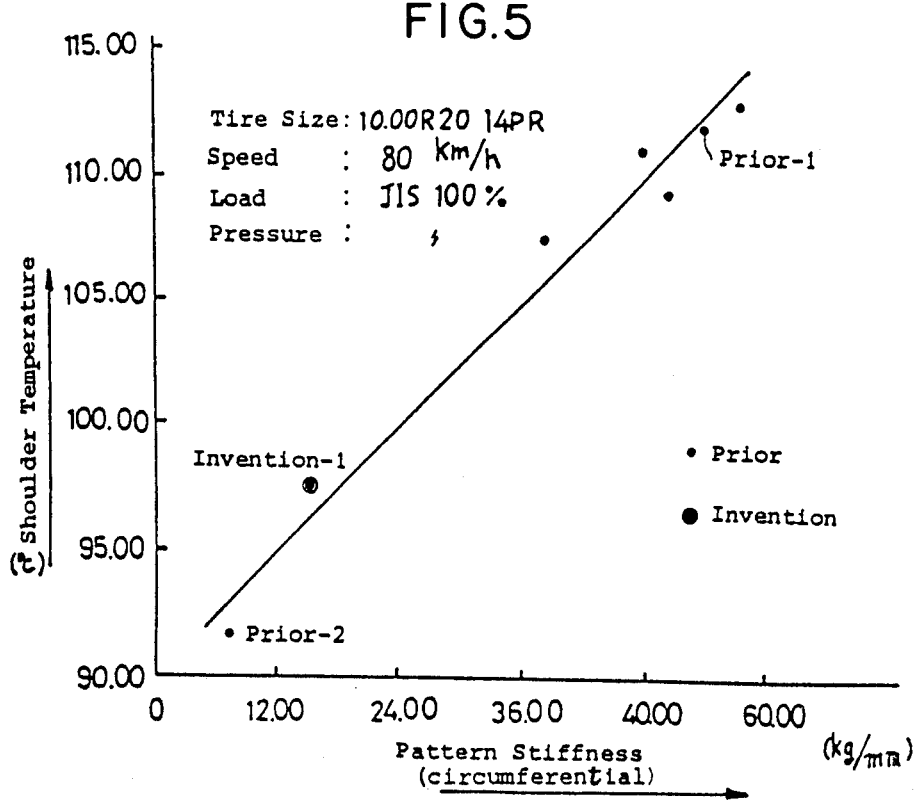
FIG. 5 is a graph showing the relation between pattern circumferential stiffness and temperature at the shoulder part.
Figure 10A:
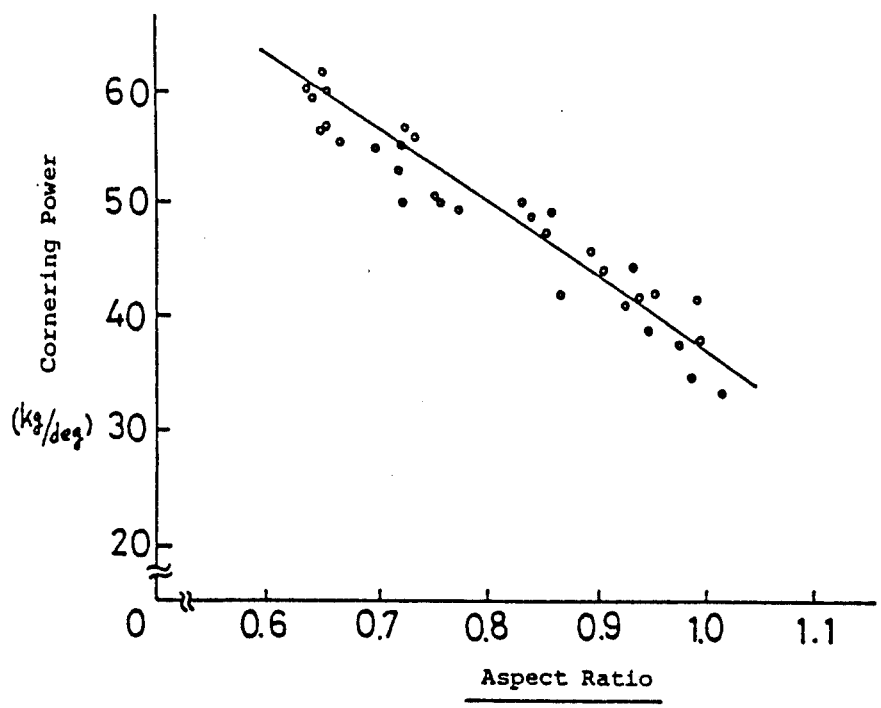
FIG. 10a is a graph showing the relation between cornering power and the aspect ratio of a tire.
Figure 10B:
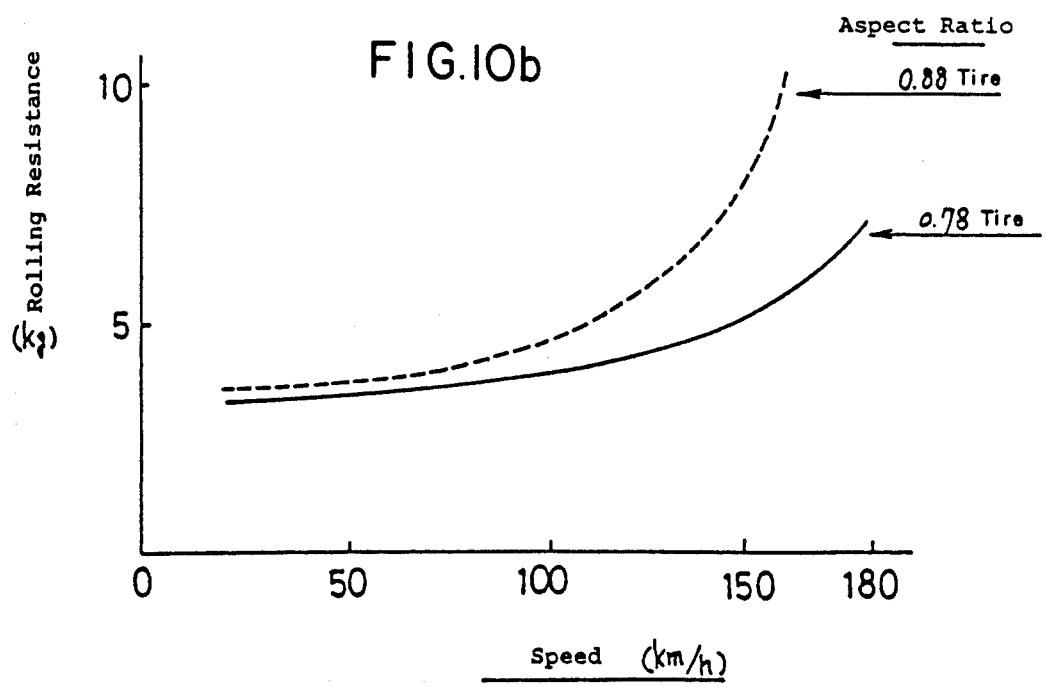
FIG. 10b is a graph showing the relation between rolling resistance and the aspect ratio.

FIG. 5 graphically shows a relation between pattern circumferential stiffness at the shoulder part and temperature, wherein the lower the circumferential stiffness, the lower the temperature at the shoulder part. FIG. 6 shows a relation between the volume of cut groove and temperature, wherein the larger the volume of cut groove, the lower the temperature, but, as regards an embodiment of this invention, it can be fully understood that, even when the volume of cut groove is equal to that of the conventional tire, the temperature is nearly 20° lower than that in the conventional tire. A comparison of transverse stiffness with the circumferential stiffness of a pattern indicates that, as shown in FIG. 8, a temperature in the pattern No. 4 as shown in FIG. 3(c) having transverse stiffness lower than circumferential stiffness as shown in FIG. 7 is 111° which is not low at all.

Incidentally, circumferential stiffness per pitch of the pattern No. 4 was 44.0 whereas transverse stiffness 25.2. From the above fact, it has been found that lowering of temperature must depend on a reduction of circumferential stiffness rather than transverse stiffness.

Figure 4:
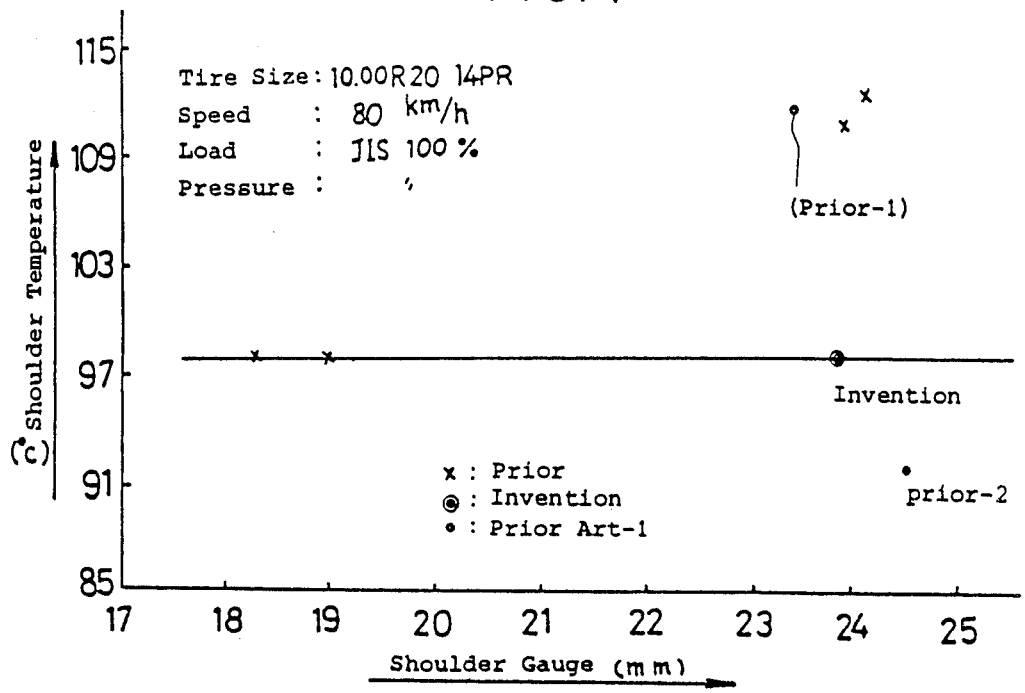
FIG. 4 is a graph showing the relation of rubber gauge with heat generation at the shoulder part with respect to the pattern of Example 1 (FIG. 1) according to the present invention, that of Control Example (shown in FIG. 3(a) and FIG. 3(b)), and that of the conventional tire.

FIG. 4 graphically shows that a relation between the tread gauge at the shoulder parts and temperature in the tire, wherein the temperature rises with an increase in tread gauge in conventional a tire but, in the embodiment of this invention (FIG. 1), despite the shoulder gauge of 23.8 mm, the temperature of the tire is as low as that of the conventional tire having the gauge of 18 to 19 mm.

Figure 3A:
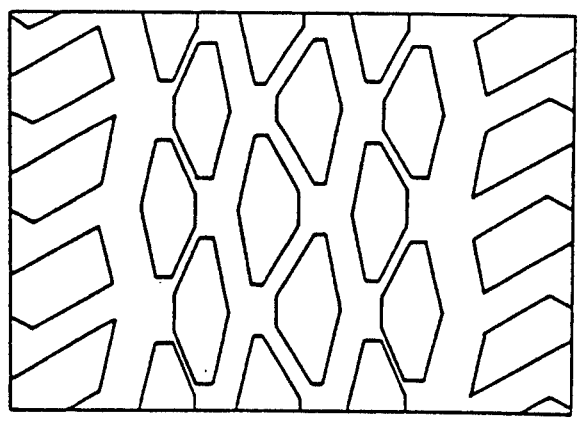
FIG. 3(a) is a developed plane view of a tread pattern in which the index of circumferential stiffness satisfies a value specified by the present invention but the index of groove volume is out of the scope of this invention.

It is supposed that lowering of stiffness of the pattern depending on pattern effect leads to decrease in resistance of the tire to wear, however, in this respect, FIG. 9 shows that values of pattern stiffness of tires shown in FIG. 1 and 3(a) are 15.6 and 7.7, respectively, that is, 1:0.5 in terms of ratio, and volumes of cut grooves are 4.16 cm$^3$ and 14.4 cm$^3$, respectively, that is, 1:3.5 in ratio. In the pattern shown in FIG. 1, the volume of groove is small in proportion to pattern stiffness (FIG. 9) as compared with that shown in FIG. 3. That is to say, it has been found that, when reducing pattern stiffness, resistance to wear is reduced with the increase in volume of the cut groove and, therefore, by setting narrow the width t of cut at the shoulder part as in the pattern shown in FIG. 1, control over temperature rise and prevention of decrease in resistance to wear are ensured. An appropriate width t of a cut s is under 6 mm, more preferably from 1 to 3 mm. A volume index of the cut is preferably within the range from 2.5 to 15. An index exceeding 16 results in too large volume of the cut which accelerates wear of rubber and, further, unfavorably generates noise or bites pebbles. On the other hand, too small index not exceeding 2.4 degrades wet gripping and causes problems in safety of vehicles. An index of circumferential stiffness is preferable when ranging from 30 to 70 but, when being low as not greater than 29, causes the rubber block to tend to chip off and, when being 71 or higher, invites such problems as to generate a high temperature. And, a plurality of cut groove are arranged in such a way as to set the circumferential stiffness index to be 30 to 70, so the grounding performance of tread is improved and the slippage of tread did not occur, which lead to the great improvement of the so-called step shoulder wear.

An example according to the present invention on the basis of the above described findings will be explained with reference to FIG. 1.

The tread 1 comprises a crown part CR defined by longitudinal main deepest grooves G1 and G2 extending in the circumferential direction of the tire and centered at the equatorial plane C of the tire so as to extend in width corresponding to 30 to 65% of the tread width TW, and also shoulder parts extending outside both sides of the said crown part CR, in which circumferentially extending longitudinal narrow grooves g1 and g2 narrower than the said longitudinal main grooves G1 and G2 are arranged on the crown part, sub-groove m and n extend between longitudinal main grooves and between the main groove and the narrow groove to communicate with each other so as to form rows of blocks B1, B2 and B3 on the crown part, each row of block comprises approximately parallelogrammatic blocks B. In the shoulder blocks SH lying outside longitudinal main groove G1 and G2, a plurality of cut s are provided in the circumferential direction of the tire at equal pitches of 15 mm and at an inclination angle α of 30° with respect to the axial direction of the tire, the width t and depth h1 of the cut s being 2 mm and 13 mm, respectively. A depth ho of the longitudinal main grooves G1 and G2 is to be of extra heavy tread type. For example, a depth ranging from 16.6 mm to 20.6 mm is adopted to the tire of 10.00 R 20 in size. In the present example, a depth is set at 18.00 mm. A width GW of the groove G in the shape of a U at cross section A2—A2 is 14.5 mm. A longitudinal narrow groove g is 18 mm depth and 9.5 mm width; a sub-groove m is 5 mm width and 11 mm depth; and another sub-groove n is 2 mm width and 9 mm depth. In the example No. 1 shown in FIG. 1, a pattern stiffness index and cut groove volume index are 64 and 10.5, respectively. On the other hand, control example 1, 2 according to the prior art were made on trial. Specifications of test samples are listed in Table 4.

TABLE 4

Figure 3B:
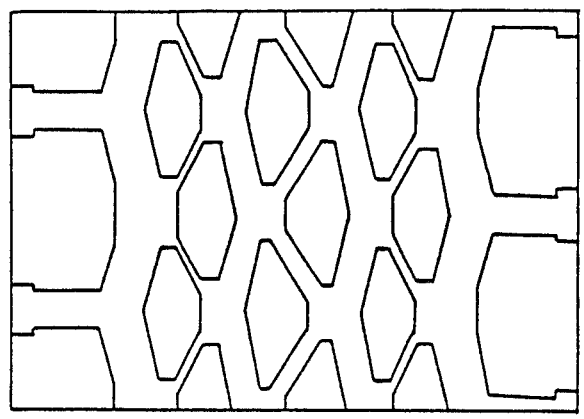
FIG. 3(b) is a developed plan view of a tread pattern having a series of lateral grooves at shoulder parts according to the prior art.
Figure 3C:
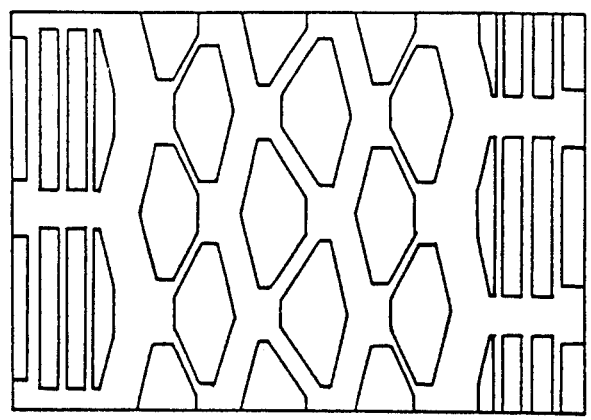
FIG. 3(c) is a developed plan view of a tread pattern in which the index of transverse stiffness at the shoulder parts is lower than that of circumferential stiffness.

| | Example 1 | Control Example 2 | Control Example 1 |
|---|---|---|---|
| Depth of cut at shoulder part (mm) | 13 | 18 | 5.5 |
| Width of cut at shoulder part (mm) | 2 | 10 | 11.5 |
| Ratio of cut surface area at shoulder part | 0.19 | 0.38 | 0.18 |
| Shape index at shoulder part | 0.44 | 0.34 | 0.72 |
| Pattern transverse stiffness at shoulder part (kg/mm) | 18.6 | 8.8 | 52.7 |
| Pattern circumferential stiffness at shoulder part (kg/mm) | 15.6 (64) | 7.7 (38) | 53.8 (94) |
| Volume of cut at shoulder part (cm³) | 4.160 (10.5) | 14.400 (36.4) | 1.898 (4.8) |
| Thickness of rubber at shoulder part (mm) | 23.9 | 24.6 | 23.5 |
| Tread radius of curvature at 100% air pressure (mm) | 585 | 585 | 585 |
| Tread pattern | FIG. 1 | FIG. 3a | FIG. 3b |

The numeral in parenthesis, ( ), indicates an index.

Above said test samples are 10.00 R 20 14 PR. in size and tire construction except tread pattern and component materials are of all said specification.

The test results of these three kind of tires are as follow. (High-speed durability)

The test of durability to high speed running about said sample tires was performed according to the following method, results thereof being shown in Table 5.

TABLE 5

| | Breaking Speed | Length of time of running |
|---|---|---|
| Example 1 | 130 km/h | 60 min. to fail |
| Control example 1 | 100 km/h | 50 min. to fail |
| Control example 2 | 130 km/h | 110 min. to fail |

Tires were driven on the drum type running tester according to the stepped speed running method of conditions that:
Load: 3,780 kg
Initial internal pressure: 7.25 kg/cm²
Rim: 7.50 V
wherein results were evaluated by the level of speed at which the tire failed due to heat generation and the length of time spent for running at the above speed. A tire of Example 1 according to the present invention cleared a speed of 130 km/h but a tire of Control Example 1 which attached much importance to the resistance to wear, could clear only 100 km/h, lower by two step than 130 km/h. On the contrary, a tire of Control Example 2 which sacrificed the resistance to wear, cleared a speed of 130 km/h because of lower heat generation due to reduced pattern circumferential stiffness. A tire according to the present invention designed to be provided with "cut grooves" on the shoulder zones for reducing pattern circumferential stiffness, controlled heat generation in the shoulder parts, and provided high degree of durability. (Resistance to wear and stepped shoulder wear)

As regards resistance of the tread to wear, comparison tests using an actual truck were performed and amounts of wear of tread rubber per 1,000 km running were compared by measurements of remaining groove depth after 50,000 km running. As shown in Table 6, a tire (Example 1) according to the present invention demonstrated an excellent resistance to wear by the contribution of heat generation to a low degree, more uniform distribution of grounding pressure and high gripping performance. At the same time, the stepped shoulder wear is greatly improved, too.

TABLE 6

| Results of tests of resistance to wear by fleet test | | |
|---|---|---|
| | Index of wear of* tread rubber | Stepped shoulder wear *1 |
| Control Example 1 | 100 | 3-5 |
| Control Example 2 | 80 | 3-4 |
| Example 1 | 105 | 0-1 |

*Note: The larger the index number, the better the resistance to wear. The above index number may be regarded as a ratio between wear life span of treads.
*1 Note: to measure the stepped shoulder wear by R gauge after 50,000 km travelling.

Wet grip performance
Values obtained from comparison of wet grip performances are shown in Table 7.

TABLE 7

| | Wet grip performances | | |
|---|---|---|---|
| | Control Example 1 | Control Example 2 | Example 1 |
| Index of Wet grip | 100 | 110 | 115 |

Wet grip performances were observed by confirming braking distances traveled by a truck driven at a speed of 80 km/h on an asphalt-paved wet road, and indicated in terms of index on the assumption that the index of breaking distance of Control Example 1 is 100. In this case, too, the larger the index number, the better the performance, and a tire (Example 1) according to the present invention which exhibited a strong braking force is verified to be excellent in wet grip performance as one of important requirements for safety of a vehicle.
Effect of the Invention As has been described, this invention provides a well-balanced tire in which a plurality of narrow cuts are disposed on both shoulder parts, where the heat generation is most notable in a conventional tire, to control the heat generation by decreasing the pattern stiffness and preventing the slippage of tread rubber due to improved grounding performance of both shoulder parts, so the high-speed durability and the stepped shoulder wear are improved in spite of the extra heavy tread with the deepest grooves being the longitudinal main grooves. At the same time, wear life of tread, wandering performance including wet grip performance, ride feeling and handling stability can simultaneously and effectively improved in well-balanced manner, thus providing a high-performance tire.

What is claimed is:

1. In a heavy duty pneumatic radial tire comprising:

a pair of bead cores disposed in beads of the tire, respectively:

a carcass, extending across the beads, and having at least one carcass ply of rubberized metal cords of a radial or semi-radial construction, both edges of the carcass ply turned up around the bead cores from the axially inside to the outside of the bead core to form turned up portions axially outside the bead cores and a main portion therebetween;

a tread and a pair of sidewalls on the carcass;

a bead apex rubber stock, disposed between the main portion and the turned up portion the carcass ply, and extending radially outwardly from its base adjacent to each bead core;

a reinforcing layer of rubberized steel cords disposed axially outside said turned up portion of the carcass ply;

a protective layer of organic fiber cords disposed axially outside the reinforcing layer, said turned up portion and said apex rubber stock adjacent to the reinforcing layer;

a belt layer, including at least three plies of rubberized parallel metal cords, and disposed between the carcass and the tread, for providing stiff reinforcement beneath the tread, said parallel metal cords in each ply being arranged at a relatively small angle with respect to the circumferential direction of the tire so as to cross with one another, the improvement comprising:

said tread having two main longitudinal grooves extending circumferentially in a zigzag or wavy line to divide the tread into two shoulder parts and a crown part therebetween; said crown part being centered on the equatorial plane of the tire and having width of about 30 to 65% of the tread width and further including at least one central row of blocks;

each tread shoulder part having a plurality of generally axially extending narrow cut grooves to form circumferentially separated blocks therein;

a volume index of the narrow grooves being in a range of 2.5 to 15; and a circumferential stiffness index in each shoulder part being in a range of 30 to 70, wherein the volume index and the circumferential stiffness index are defined as follows:

Volume Index = $\{V/(S \times d)\} \times 100$ $V$: total volume of the narrow grooves in the shoulder part $S$: surface area of the shoulder part $d$: depth of the main longitudinal groove Circumferential Stiffness Index = $(Kpt/Kpo) \times 100$ $Kpt$: circumferential stiffness in the shoulder part after the narrow grooves are provided $Kpo$: circumferential stiffness in the shoulder part before the narrow grooves are provided Circumferential Stiffness = $F/y$ $F$: tangential force in the circumferential direction of the tire at the ground contacting surface of the shoulder part $y$: variation of the ground contacting surface in the circumferential direction of the tire.

2. A radial ply tire as set forth in claim 1, wherein said cut grooves are not greater than 6 mm in width and equal to or smaller than the longitudinal main groove in depth.

3. A radial ply tire as set forth in claim 1, wherein the center lines of said cut grooves incline at an angle of 0° to 45° with respect to the axial direction of the tire.

4. A radial ply tire as set forth in claim 1, wherein the circumferential pitch length between said cut grooves is under 1.1% of the circumference of the tire at the center of the tread when the tire is inflated to the normal maximum inflation pressure.

* * * * *